United States Patent
Downs

(10) Patent No.: US 9,894,995 B2
(45) Date of Patent: Feb. 20, 2018

(54) FURNITURE STABILIZING ASSEMBLY

(71) Applicant: Karen Downs, Norfolk, VA (US)

(72) Inventor: Karen Downs, Norfolk, VA (US)

(*) Notice: Subject to any disclaimer, the term of this patent is extended or adjusted under 35 U.S.C. 154(b) by 0 days.

(21) Appl. No.: 15/176,301

(22) Filed: Jun. 8, 2016

(65) Prior Publication Data

US 2017/0354250 A1    Dec. 14, 2017

(51) Int. Cl.
*A47B 91/12* (2006.01)
*A47B 91/02* (2006.01)
*F16B 47/00* (2006.01)
*A47B 95/00* (2006.01)
*A47B 91/00* (2006.01)
*A47B 91/04* (2006.01)
*B60B 33/00* (2006.01)

(52) U.S. Cl.
CPC ........... *A47B 91/12* (2013.01); *A47B 91/005* (2013.01); *A47B 91/02* (2013.01); *A47B 91/04* (2013.01); *A47B 95/00* (2013.01); *F16B 47/003* (2013.01); *B60B 33/0018* (2013.01)

(58) Field of Classification Search
CPC ....... A47B 91/04; A47B 91/005; A47B 91/12; A47B 95/00; A47B 91/02; B60B 33/0018
USPC ...... 248/188.9, 188.8, 188.91, 188.2, 346.11
See application file for complete search history.

(56) References Cited

U.S. PATENT DOCUMENTS

| | | | | |
|---|---|---|---|---|
| 1,345,987 | A | * | 7/1920 | Bocking ................... F16F 1/44 16/42 R |
| RE18,647 | E | * | 11/1932 | Phillips .................. A47B 91/04 248/188.2 |
| 2,476,381 | A | | 7/1949 | Peavey |
| 2,893,164 | A | * | 7/1959 | Martin ................... A47B 91/12 248/188.2 |
| 2,933,850 | A | * | 4/1960 | Martin ................... A47B 91/12 248/188.2 |
| 3,138,893 | A | * | 6/1964 | Rupar .................... A47B 91/12 248/346.11 |
| 3,326,508 | A | * | 6/1967 | Born ...................... A47B 91/06 16/42 R |
| 4,919,386 | A | * | 4/1990 | Cassina .................. A47B 91/00 248/188.2 |
| 5,070,868 | A | * | 12/1991 | Hepburn ............... A61F 5/0195 602/27 |
| 5,158,512 | A | * | 10/1992 | Irwin ................. A63B 23/0458 482/142 |
| 5,469,599 | A | * | 11/1995 | Wurdack .............. A47B 91/002 16/42 R |
| 5,615,429 | A | * | 4/1997 | Williams ............. A47C 19/024 5/509.1 |
| 5,802,669 | A | * | 9/1998 | Wurdack .............. A47B 91/002 16/42 R |
| 6,047,938 | A | * | 4/2000 | Mitchell ................... A47F 1/06 211/49.1 |

(Continued)

FOREIGN PATENT DOCUMENTS

DE             676596 C   *   6/1939    ............. A47B 91/12

*Primary Examiner* — Eret McNichols

(57) ABSTRACT

A furniture stabilizing assembly for keeping furniture level on a support surface includes at least one spacer that may be inserted between a leg of furniture and a support surface. Thus, the furniture may sit level on the support surface. The at least one spacer has an adjustable height. Thus, the at least one spacer may space the leg of furniture a selected distance from the support surface.

2 Claims, 4 Drawing Sheets

(56) References Cited

U.S. PATENT DOCUMENTS

| | | | |
|---|---|---|---|
| 6,901,629 B2* | 6/2005 | Wurdack | A47B 91/002 16/42 R |
| D513,583 S | 1/2006 | Chase | |
| 8,468,957 B2* | 6/2013 | Ruiz | A47B 91/00 108/91 |
| 8,496,214 B2* | 7/2013 | Fichter | G03G 21/1619 248/188.2 |
| 9,033,293 B1* | 5/2015 | Glenn | A47B 91/005 248/188.2 |
| 9,345,325 B2* | 5/2016 | Floersch | F16M 7/00 |
| D760,069 S * | 6/2016 | Pierce | D8/374 |
| 2001/0023509 A1* | 9/2001 | Becker | A47C 19/04 5/509.1 |
| 2005/0003723 A1 | 1/2005 | Brourard et al. | |
| 2012/0241569 A1 | 9/2012 | Downs | |
| 2014/0054432 A1* | 2/2014 | Entis | A47G 23/032 248/346.11 |

* cited by examiner

FURNITURE STABILIZING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to stabilizing devices and more particularly pertains to a new stabilizing device for keeping furniture level on a support surface.

BRIEF SUMMARY OF THE INVENTION

An embodiment of the disclosure meets the needs presented above by generally comprising at least one spacer that may be inserted between a leg of furniture and a support surface. Thus, the furniture may sit level on the support surface. The at least one spacer has an adjustable height. Thus, the at least one spacer may space the leg of furniture a selected distance from the support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
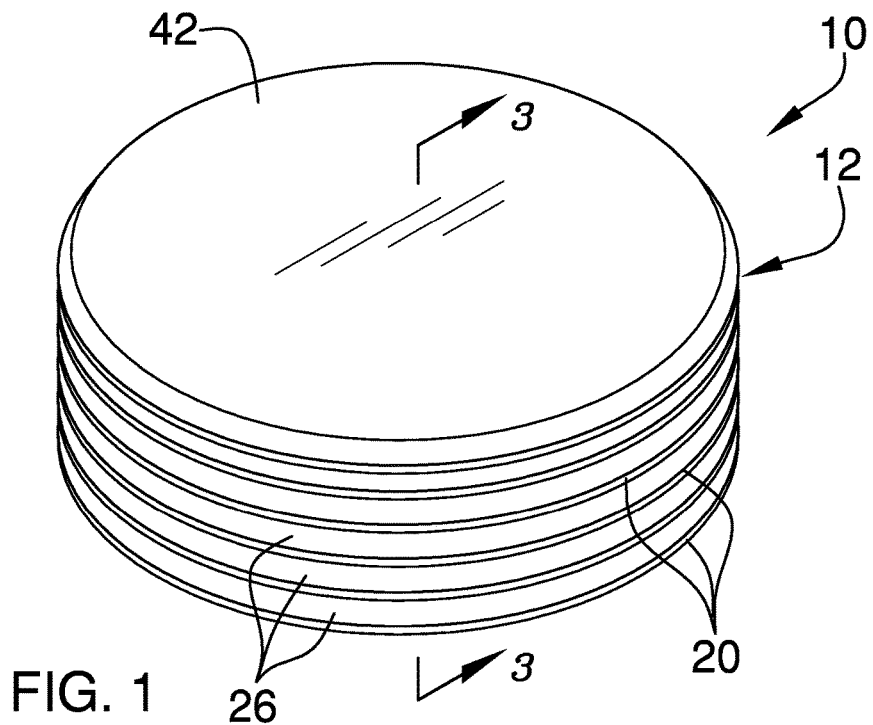
FIG. 1 is a top perspective view of a furniture stabilizing assembly according to an embodiment of the disclosure.

With reference now to the drawings, and in particular to FIGS. 1 through 6 thereof, a new stabilizing device embodying the principles and concepts of an embodiment of the disclosure and generally designated by the reference numeral 10 will be described.

As best illustrated in FIGS. 1 through 6, the furniture stabilizing assembly 10 generally comprises at least one spacer 12 that may be inserted between a selected leg 14 of furniture 16 and a support surface 18. The furniture 16 may be a table, a chair or other standing furniture. The support surface 18 may be a floor. The at least one spacer 12 facilitates the furniture 16 to sit level on the support surface 18 when the selected leg 14 is shorter than other legs of the furniture 16. The at least one spacer 12 has an adjustable height. Thus, the at least one spacer 12 may space the leg 14 of furniture 16 a selected distance from the support surface 18.

The at least one spacer 12 comprises a plurality of first disks 20 and each of the first disks 20 has a first surface 22 and a second surface 24. A plurality of second disks 26 is provided. Each of the second disks 26 has a primary surface 28 and a secondary surface 30. The primary surface 28 has a well 32 extending toward the secondary surface 30. The well 32 substantially covers the primary surface 28. Each of the second disks 26 may be comprised of a resiliently compressible material such as rubber or the like.

The first disks 20 and the second disks 26 are alternately stacked. The second surface 24 of the first disks 20 is positioned in the well 32 of an associated one of the second disks 26. A selected number of the first disks 20 and the second disks 26 are stacked to establish a selected height of the at least one spacer 12.

The plurality of first disks 20 includes a bottommost first disk 34. The plurality of second disks 26 includes a topmost second disk 36. The first surface 22 corresponding to the bottommost first disk 34 may abut the support surface 18. Each of the second disks 26 has a peripheral edge 38. The peripheral edge 38 corresponding to each of the second disks 26 tapers outwardly between the secondary surface 30 and the primary surface 28.

Figure 2:
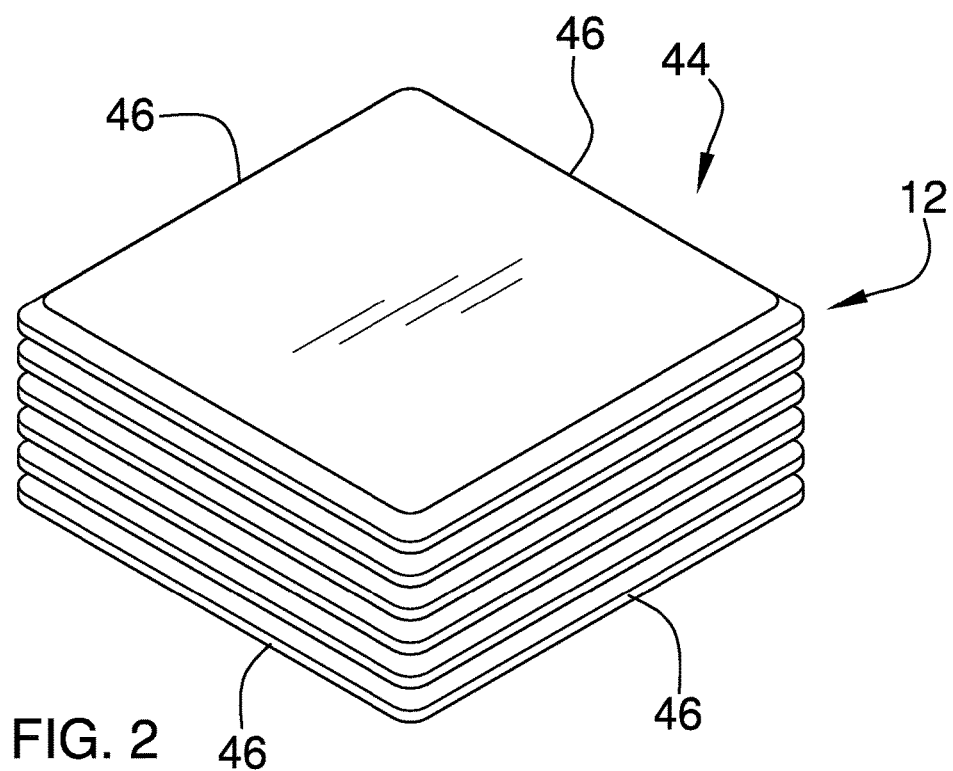
FIG. 2 is a perspective view of an alternative embodiment of the disclosure.
Figure 3:
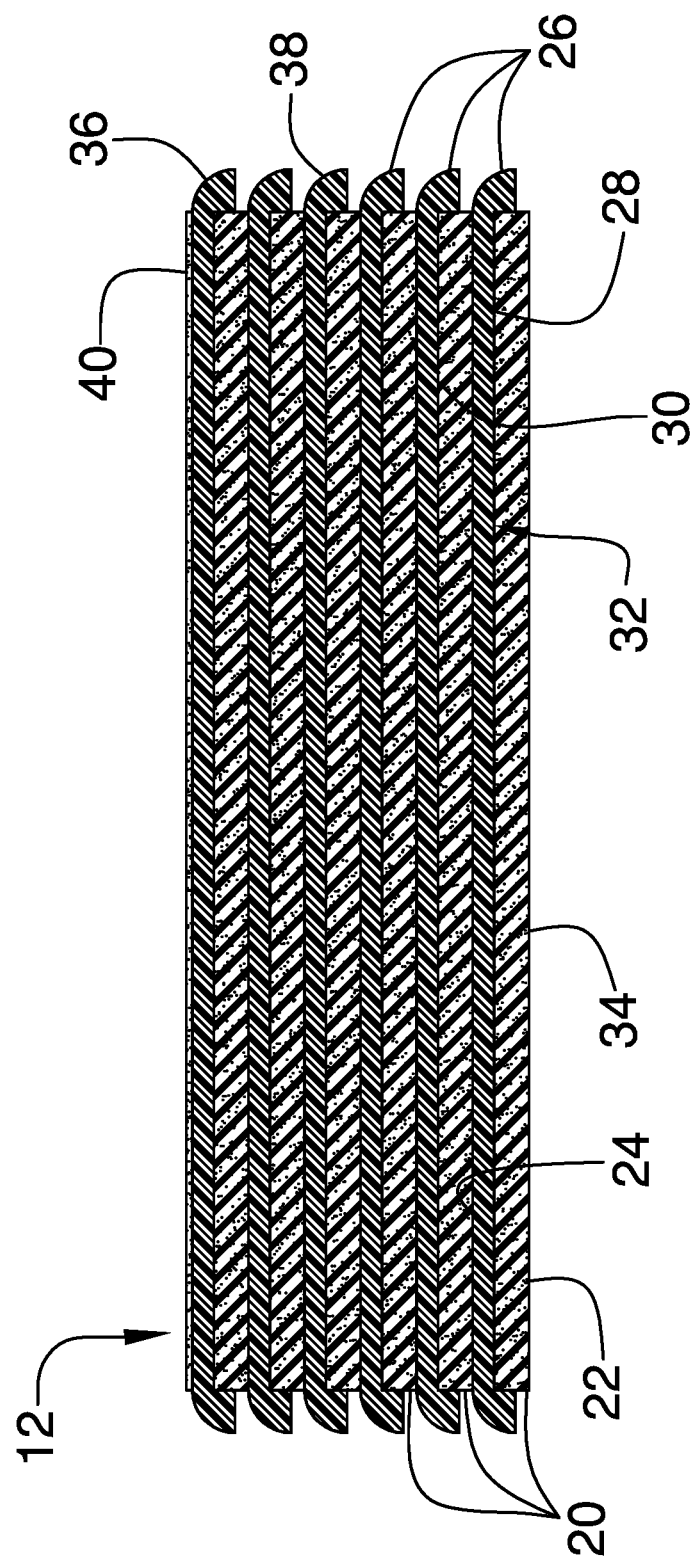
FIG. 3 is a cross sectional view taken along line 3-3 of FIG. 1 of an embodiment of the disclosure.
Figure 4:
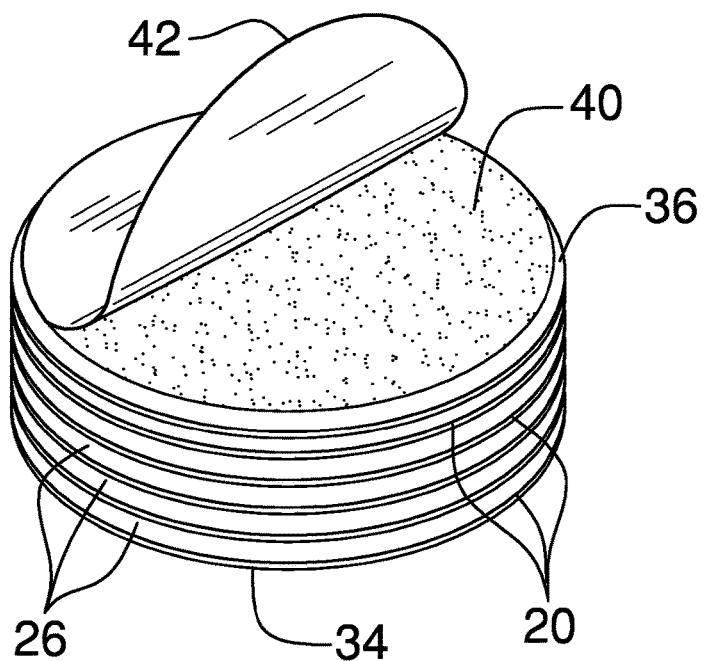
FIG. 4 is a perspective view of an embodiment of the disclosure.
Figure 5:
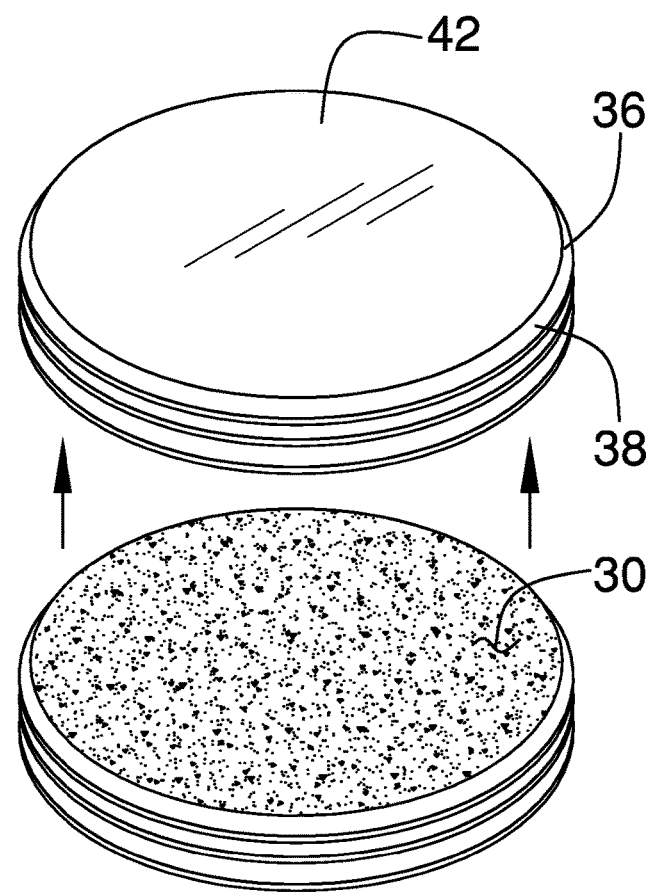
FIG. 5 is an exploded perspective view of an embodiment of the disclosure.
Figure 6:
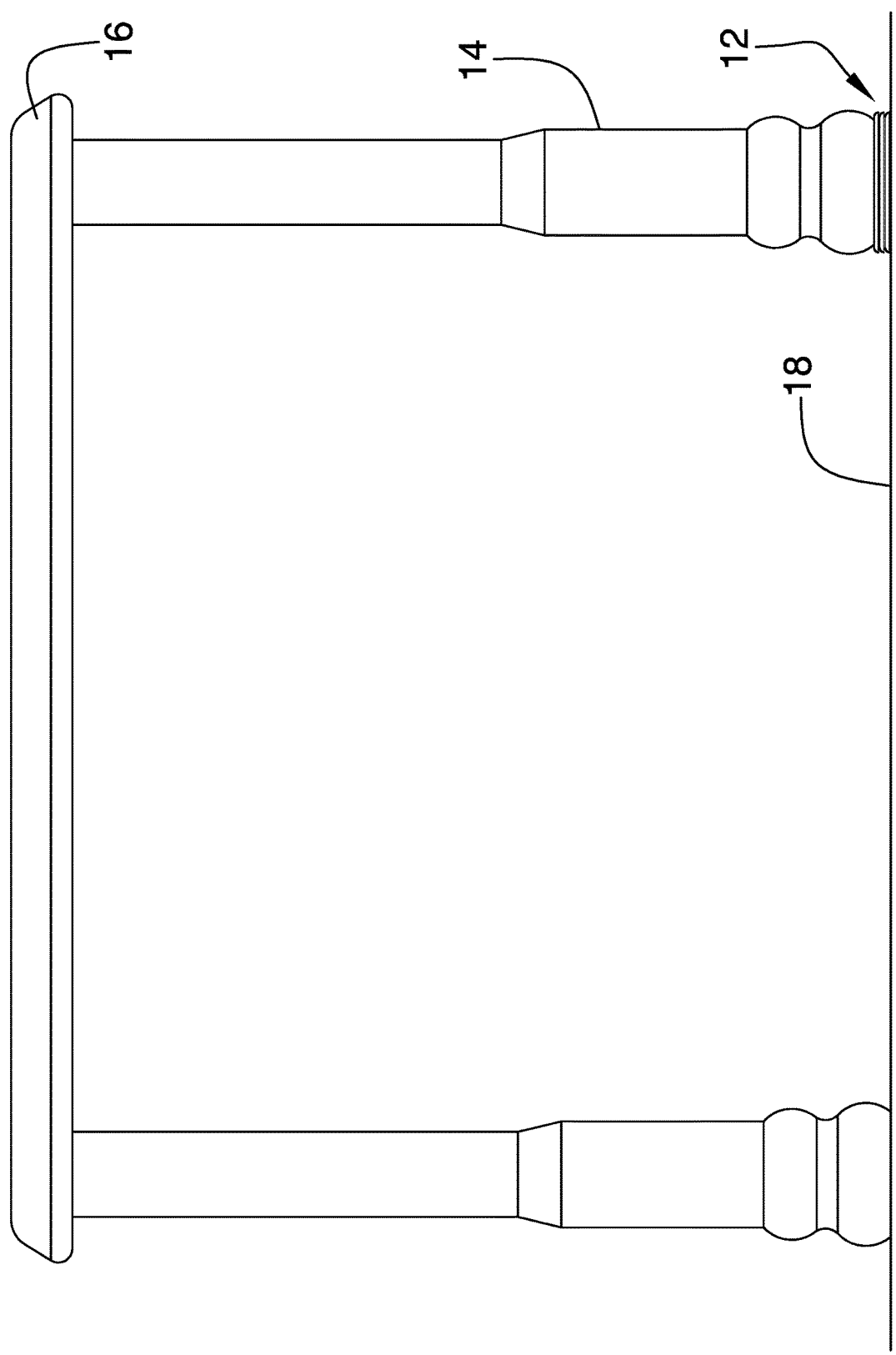
FIG. 6 is a perspective in-use view of an embodiment of the disclosure.

An adhesive layer 40 is coupled to the secondary surface 30 corresponding to the topmost second disk 36. The adhesive layer 40 may adhesively engage the leg 14 of the furniture 16. Thus, the at least one spacer 12 is retained on the leg 14 of the furniture 16. A protective layer 42 is removably positioned on the adhesive layer 40. The protective layer 42 inhibits the adhesive layer 40 from becoming contaminated prior to being used. In an alternative embodiment 44 as shown in FIG. 2, the at least one spacer 12 may have a plurality of intersecting peripheral sides 46. Thus, the at least one spacer 12 may have a rectangular shape.

In use, a selected number of first disks 20 and second disks 26 are stacked to establish a selected height of the at least one spacer 12. The at least one spacer 12 is positioned beneath a selected leg 14 of the furniture 16. Thus, the at least one spacer 12 inhibits the furniture 16 from rocking due to a difference in lengths between legs 14 of the furniture 16. The protective layer 42 is removed from the adhesive layer 40 and the adhesive layer 40 engages the selected leg 14. A plurality of the at least one spacers 12 may be used on multiple legs 14 of the furniture 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A furniture stabilizing assembly being configured to be positioned beneath legs of furniture, said assembly comprising:
    at least one spacer being configured to be inserted between a leg of furniture and a support surface thereby facilitating the furniture to sit level on the support surface, said at least one spacer having an adjustable height wherein said at least one spacer is configured to space the leg of furniture a selected distance from the support surface, wherein said at least one spacer comprises
        a plurality of first disks, each of said first disks having a first surface and a second surface, and
        a plurality of second disks, each of said second disks having a primary surface and a secondary surface, said secondary surface defining an uppermost planar face of said second disk parallel to said primary surface, said primary surface having a well extending toward said secondary surface, said well substantially covering said primary surface, said first disks and said second disks being alternately stacked having said second surface of said first disks being positioned in said well, a selected number of said first disks and said second disks being stacked to establish a selected height of said at least one spacer;
    wherein said plurality of first disks includes a bottommost first disk, said plurality of second disks includes a topmost second disk, said first surface corresponding to said bottommost disk being configured to abut the support surface; and
    an adhesive layer being coupled to said secondary surface corresponding to said topmost second disk wherein said adhesive layer is configured to adhesively engage the leg of the furniture thereby facilitating said at least one spacer to be retained on the leg of the furniture.

2. A furniture stabilizing assembly being configured to be positioned beneath legs of furniture, said assembly comprising:
    at least one spacer being configured to be inserted between a leg of furniture and a support surface thereby facilitating the furniture to sit level on the support surface, said at least one spacer having an adjustable height wherein said at least one spacer is configured to space the leg of furniture a selected distance from the support surface, said at least one spacer comprising:
        a plurality of first disks, each of said disks having a first surface and a second surface,
        a plurality of second disks, each of said second disks having a primary surface and a secondary surface, each of said second disks having a primary surface and a secondary surface, said secondary surface defining an uppermost planar face of said second disk parallel to said primary surface, said primary surface having a well extending toward said secondary surface, said well substantially covering said primary surface, said first disks and said second disks being alternately stacked having said second surface of said first disks being positioned in said well, a selected number of said first disks and said second disks being stacked to establish a selected height of said at least one spacer, said plurality of first disks including a bottommost first disk, said plurality of second disks including a topmost first disk, said first surface corresponding to said bottommost first disk being configured to abut the support surface, and
        an adhesive layer being coupled to said secondary surface corresponding to said topmost second disk wherein said adhesive layer is configured to adhesively engage the leg of the furniture thereby facilitating said at least one spacer to be retained on the leg of the furniture.

* * * * *